United States Patent
Yamada et al.

(10) Patent No.: US 11,493,008 B2
(45) Date of Patent: Nov. 8, 2022

(54) STRADDLE-TYPE VEHICLE

(71) Applicant: HONDA MOTOR CO., LTD., Tokyo (JP)

(72) Inventors: Shinichi Yamada, Wako (JP); Shoji Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 660 days.

(21) Appl. No.: 16/461,920

(22) PCT Filed: Mar. 29, 2017

(86) PCT No.: PCT/JP2017/013091
§ 371 (c)(1),
(2) Date: May 17, 2019

(87) PCT Pub. No.: WO2018/123091
PCT Pub. Date: Jul. 5, 2018

(65) Prior Publication Data
US 2019/0322254 A1    Oct. 24, 2019

(30) Foreign Application Priority Data

Dec. 27, 2016  (JP) .............................. JP2016-253531

(51) Int. Cl.
*B60T 8/176* (2006.01)
*B62K 11/06* (2006.01)
(Continued)

(52) U.S. Cl.
CPC ......... *F02M 35/162* (2013.01); *B60T 8/1706* (2013.01); *B60T 8/176* (2013.01);
(Continued)

(58) Field of Classification Search
CPC ....... B60T 8/1706; B60T 8/176; B62K 11/06; B62K 19/38; B62K 11/04; B62L 1/00; B62L 3/00
See application file for complete search history.

(56) References Cited

U.S. PATENT DOCUMENTS 7,350,881 B2 * 4/2008 Asahi ...................... B62L 3/023
                                                    180/312
7,669,680 B2 * 3/2010 Hasegawa ............. B60T 8/3685
                                                    180/219
(Continued)

FOREIGN PATENT DOCUMENTS

CN      102530152       7/2012
EP      2130731 A2      12/2009
(Continued)

OTHER PUBLICATIONS

International Preliminary Report on Patentability dated Jul. 11, 2019, 12 pages.
(Continued)

*Primary Examiner* — Tony H Winner
*Assistant Examiner* — Michael R Stabley
(74) *Attorney, Agent, or Firm* — Rankin, Hill & Clark LLP

(57) ABSTRACT

A position of a center of gravity of a vehicle body is easily optimized. An ABS modulator is disposed in a vicinity of a pivot bracket, which is joined to a lower rear portion of a main frame, and to which a swing arm is swingably connected.

13 Claims, 7 Drawing Sheets

(51) Int. Cl.
  *B62K 19/38* (2006.01)
  *B62L 3/00* (2006.01)
  *F02M 35/16* (2006.01)
  *B60T 8/17* (2006.01)
  *B62L 1/00* (2006.01)
  *B62J 43/30* (2020.01)
  *B62J 11/16* (2020.01)
  *B62J 40/10* (2020.01)
  *B60T 8/32* (2006.01)

(52) U.S. Cl.
  CPC ............ *B62J 11/16* (2020.02); *B62J 40/10* (2020.02); *B62J 43/30* (2020.02); *B62K 11/06* (2013.01); *B62K 19/38* (2013.01); *B62L 1/00* (2013.01); *B62L 3/00* (2013.01); *B60T 8/3225* (2013.01); *B60T 2240/00* (2013.01); *B60T 2270/10* (2013.01)

(56) References Cited

U.S. PATENT DOCUMENTS

| | | | | |
|---|---|---|---|---|
| 8,186,470 B2 * | 5/2012 | Matayoshi | ............ | B60T 8/3685 180/227 |
| 8,439,455 B2 * | 5/2013 | Hayashi | ................ | B60T 13/686 303/137 |
| 8,887,859 B2 * | 11/2014 | Matsushima | .......... | B62K 19/38 180/312 |
| 9,022,157 B2 * | 5/2015 | Konno | .................. | B62K 19/30 180/311 |
| 9,352,799 B2 * | 5/2016 | Tsubone | ................ | B62K 25/283 |
| 9,751,587 B2 * | 9/2017 | Kitagawa | ................ | B62K 19/38 |
| 2007/0200430 A1 * | 8/2007 | Tani | ..................... | B60T 8/4081 303/137 |
| 2012/0186895 A1 | 7/2012 | Hamauzu et al. | | |
| 2015/0041232 A1 | 2/2015 | Takatsuka et al. | | |

FOREIGN PATENT DOCUMENTS

| | | |
|---|---|---|
| JP | 2005-059629 | 3/2005 |
| JP | 2006-192980 | 7/2006 |
| JP | 2007-076555 A | 3/2007 |
| JP | 2008-074206 | 4/2008 |
| JP | 2011-037355 | 2/2011 |
| JP | 2011-195023 | 10/2011 |
| JP | 2012-136124 | 7/2012 |
| JP | 2012-171549 | 9/2012 |
| JP | 2015-033975 | 2/2015 |

OTHER PUBLICATIONS

Indian Office Action dated Sep. 30, 2019, English translation included, 6 pages.
Chinese Office Action dated Apr. 1, 2020, English translation included, 18 pages.
German Office Action with English translation dated Oct. 28, 2021, 12 pages.
International Search Report, dated Jun. 27, 2017 (Jun. 27, 2017), 3 pages.
Japanese Office Action dated Jun. 5, 2018, English translation included, 10 pages.
German Office Action dated Jun. 2, 2022, English translation included, 14 pages.
Brazilian Office Action dated May 20, 2022, informal English translation included, 7 pages.

* cited by examiner

STRADDLE-TYPE VEHICLE

TECHNICAL FIELD

The present invention relates to a straddle-type vehicle including a braking force adjusting device.

BACKGROUND ART

In straddle-type vehicles such as motorcycles, some straddle-type vehicles include ABS (Antilock Brake System) modulators that function as braking force adjusting devices that adjust braking force of wheels. There is disclosed a configuration in which an ABS modulator is disposed between a pair of left and right frame members that extend rearward from a head pipe in a vehicle of this kind (refer to Patent Literature 1, for example).

CITATION LIST

Patent Literature

Patent Literature 1: Japanese Patent Laid-Open No. 2008-74206

SUMMARY OF INVENTION

Technical Problem

However, in the conventional configuration, the ABS modulator with weight is disposed in a high position at a front side of a vehicle body, and therefore, the position of the center of gravity of the vehicle body tends to be at a front side and an upper side. In particular, as the vehicle body becomes compacter, the ABS modulator affects the position of the center of gravity of the vehicle body more significantly.

Thus, the present invention has an object to easily optimize a position of a center of gravity of a vehicle body.

Solution to Problem

All of the contents of Japanese Patent Application No. 2016-253531 filed in Japan on Dec. 27, 2016 are incorporated in the description.

In order to attain the above described object, the present invention is a straddle-type vehicle including a head pipe (31), a main frame (32) that extends rearward from the head pipe (31), a pivot bracket (33) which is joined to a lower rear portion of the main frame (32), and to which a swing arm (7) is swingably connected, a seat rail (35) that extends rearward from the main frame (32), and a braking force adjusting device (80) that adjusts a braking force of wheels (5, 8), wherein the braking force adjusting device (80) is disposed in a vicinity of the pivot bracket (33).

In the above described configuration, a battery (60) may be included, wherein the battery (60) and the braking force adjusting device (80) may be disposed in positions facing each other with the main frame (32) therebetween.

Further, in the above described configuration, the braking force adjusting device (80) may include a motor (92) that adjusts a braking force, and an axis line of the motor (92) may incline outward in a vehicle width direction and rearward.

Further, in the above described configuration, the braking force adjusting device (80) may include a metal portion (91) having the motor (92), and the metal portion (91) may be disposed toward a vehicle body center.

Further, in the above described configuration, the braking force adjusting device (80) may have connection positions of hydraulic pressure pipes (23, 25) in the device (80) provided rearward and toward a vehicle body center.

Further, in the above described configuration, a stay (81) that extends under the braking force adjusting device (80) from the pivot bracket (33), and supports the braking force adjusting device (80) from below may be included.

Further, in the above described configuration, hydraulic pressure pipes (23, 25) that extend forward from the braking force adjusting device (80) may be configured by metal pipes (23A, 25A) to predetermined positions in a vicinity of the head pipe (31), and may be configured by resin pipes (23B, 25B) from the predetermined positions.

Further, in the above described configuration, hydraulic pressure pipes (23, 25) that extend forward from the braking force adjusting device (80) may be routed under the main frame (32).

Further, in the above described configuration, an intake passage (57) that extends diagonally rearward and toward a vehicle width center in plan view may be included, and the intake passage (57) may be disposed above the braking force adjusting device (80), and may incline rearward and toward the vehicle width center along a surface (80A) on an outside in a vehicle width direction, of the braking force adjusting device (80).

Further, in the above described configuration, the pivot bracket (33) may have support portions (33A, 33B) that support an engine (6) of the straddle-type vehicle.

Advantageous Effects of Invention

In the present invention, the braking force adjusting device is disposed in the vicinity of the pivot bracket which is joined to the lower rear portion of the main frame, and to which the swing arm is swingably connected, so that a position of a center of gravity of the vehicle body is more easily optimized as compared with the case where the braking force adjusting device is disposed at a high position in a front side of the vehicle body.

Further, the battery is included, and the battery and the braking force adjusting device are disposed in the positions that face each other with the main frame therebetween, so that a weight balance of the vehicle body is easily optimized.

Further, the braking force adjusting device (80) includes the motor that adjusts the braking force, and the axis line of the motor inclines outward in the vehicle width direction and rearward, so that a smooth and slim outer appearance shape with the vehicle width reduced more toward the rear side can be made.

Further, the braking force adjusting device includes the metal portion having the motor, and the metal portion is disposed toward the vehicle body center, so that the position of the center of gravity of the braking force adjusting device can be brought toward the vehicle width center.

Further, the braking force adjusting device has the connection positions of the hydraulic pressure pipes in the device provided rearward and toward the vehicle body center, so that a straining space for dropping water such as rainwater adhering to the hydraulic pressure pipes is easily ensured.

Further, the stay that extends under the braking force adjusting device from the pivot bracket, and supports the braking force adjusting device from below is included, and therefore a support structure of the braking force adjusting device can be made compact.

Further, the hydraulic pressure pipes that extend forward from the braking force adjusting device are configured by the metal pies to the predetermined positions behind the head pipe, and are configured by resin pipes from the predetermined positions, so that a range of the metal pipes is increased, and pressure loss can be reduced.

Further, the hydraulic pressure pipes that extend forward from the braking force adjusting device are routed under the main frame, so that arranging efficiency and assembling workability of the hydraulic pressure pipes are enhanced, and the hydraulic pressure pipes are easily cooled by running window under the main frame.

Further, the intake passage that extends diagonally rearward and toward the vehicle width center in plan view is included, the intake passage is disposed above the braking force adjusting device, and inclines rearward and toward the vehicle width center along the surface on the outside in the vehicle width direction, of the braking force adjusting device, so that the smooth and slim outer appearance shape with the vehicle width reduced more toward the rear side can be made.

Further, the pivot bracket has the support portion that supports the engine of the straddle-type vehicle, so that the pivot bracket can be also used as the engine hanger, and the number of components can be reduced.

DESCRIPTION OF EMBODIMENT

Hereunder, a mode of carrying out the present invention will be described with reference to the drawings.

In the explanation, description of directions such as front, rear, left, and right, and up and down are the same as respective directions of a vehicle body unless specially described otherwise. Reference sign FR illustrated in the respective drawings denotes a vehicle body front side, reference sign UP denotes a vehicle body upper side, and reference sign RH denotes a vehicle body right side.

Figure 1:
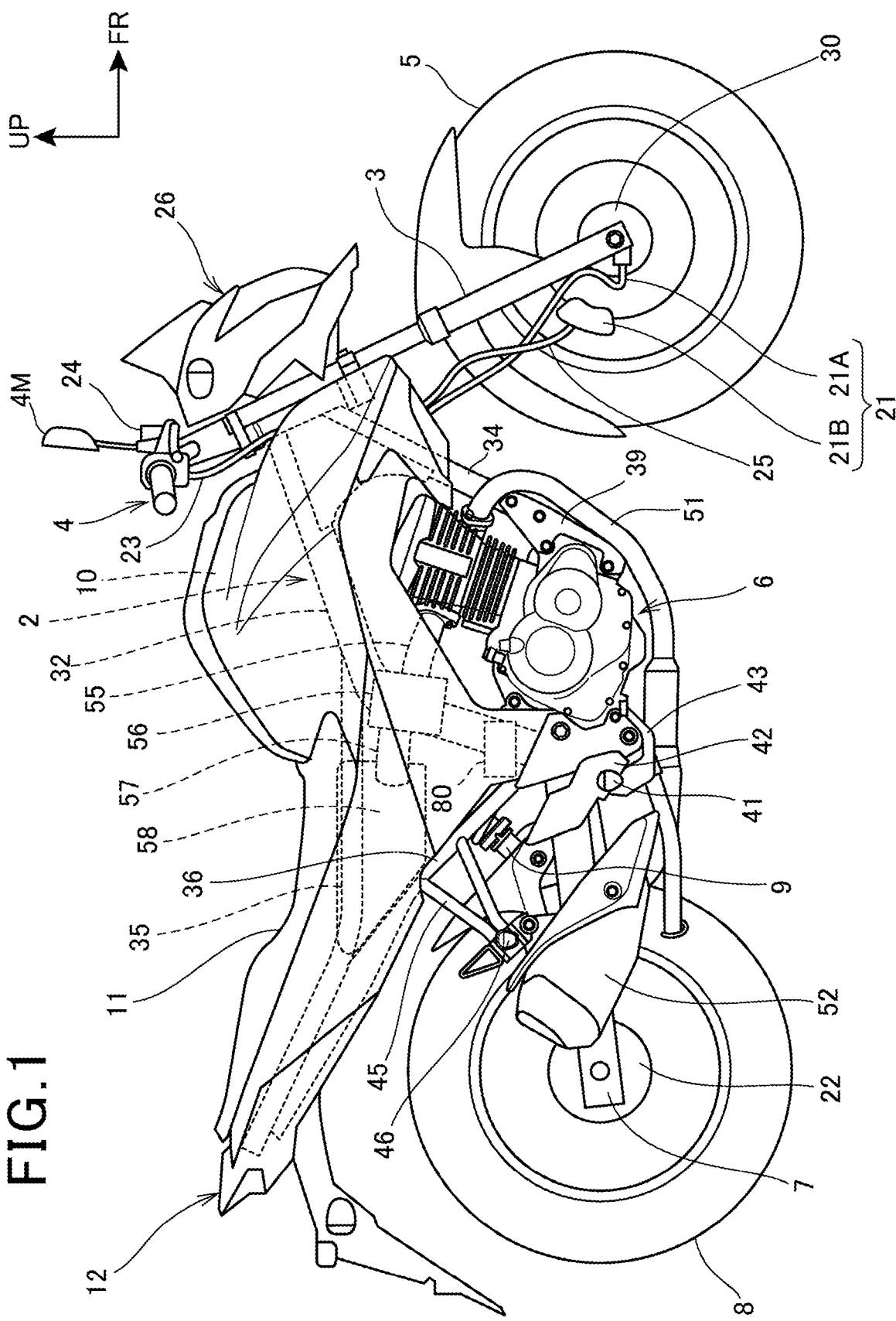
FIG. 1 is a right side view of a motorcycle according to an embodiment of the present invention.

FIG. 1 is a right side view of a motorcycle according to an embodiment of the present invention.

A motorcycle 1 is a compact vehicle in which a vehicle body frame 2 has only one main frame 32 (a so-called monoframe), and only a front wheel 5 of front and rear wheels (wheels) 5 and 8 is equipped with an ABS modulator 80 of one channel that performs antilock control.

The motorcycle 1 includes the vehicle body frame 2, a pair of left and right front forks 3 that are supported at a front portion of the vehicle body frame 2 to be steerable, a handle 4 that steers the front forks 3, the front wheel 5 that is pivoted by lower end portions of the front forks 3, and an engine 6 that is supported by the vehicle body frame 2. Further, the motorcycle 1 includes a swing arm 7 that is supported by the vehicle body frame 2 behind the engine 6 to be swingable up and down, the rear wheel 8 that is pivoted by a rear end portion of the swing arm 7, a rear cushion 9 that is placed between the swing arm 7 and the vehicle body frame 2, a fuel tank 10 that is disposed at an upper portion of the vehicle body frame 2, and an occupant seat 11 that is disposed behind the fuel tank 10. Further, the vehicle body frame 2 is covered with a vehicle body cover 12.

The motorcycle 1 has a front wheel brake 21 that brakes the front wheel 5, a rear wheel brake 22 that brakes the rear wheel 8, and a wheel speed sensor 30 that detects a speed of the front wheel 5. The front wheel brake 21 is a disk brake device that is a hydraulic pressure brake that operates by hydraulic pressure, and has a front brake disk 21A that rotates integrally with the front wheel 5, and a front brake caliper 21B that brakes the front brake disk 21A. The rear wheel brake 22 is a drum brake device that is a mechanical brake that operates by a tractive force of a rod, and is integrally provided at a wheel of the rear wheel 8.

The front wheel speed that is detected by the wheel speed sensor 30 is outputted to the ABS modulator 80, and is used in antilock control of the front wheel brake 21.

Figure 2:
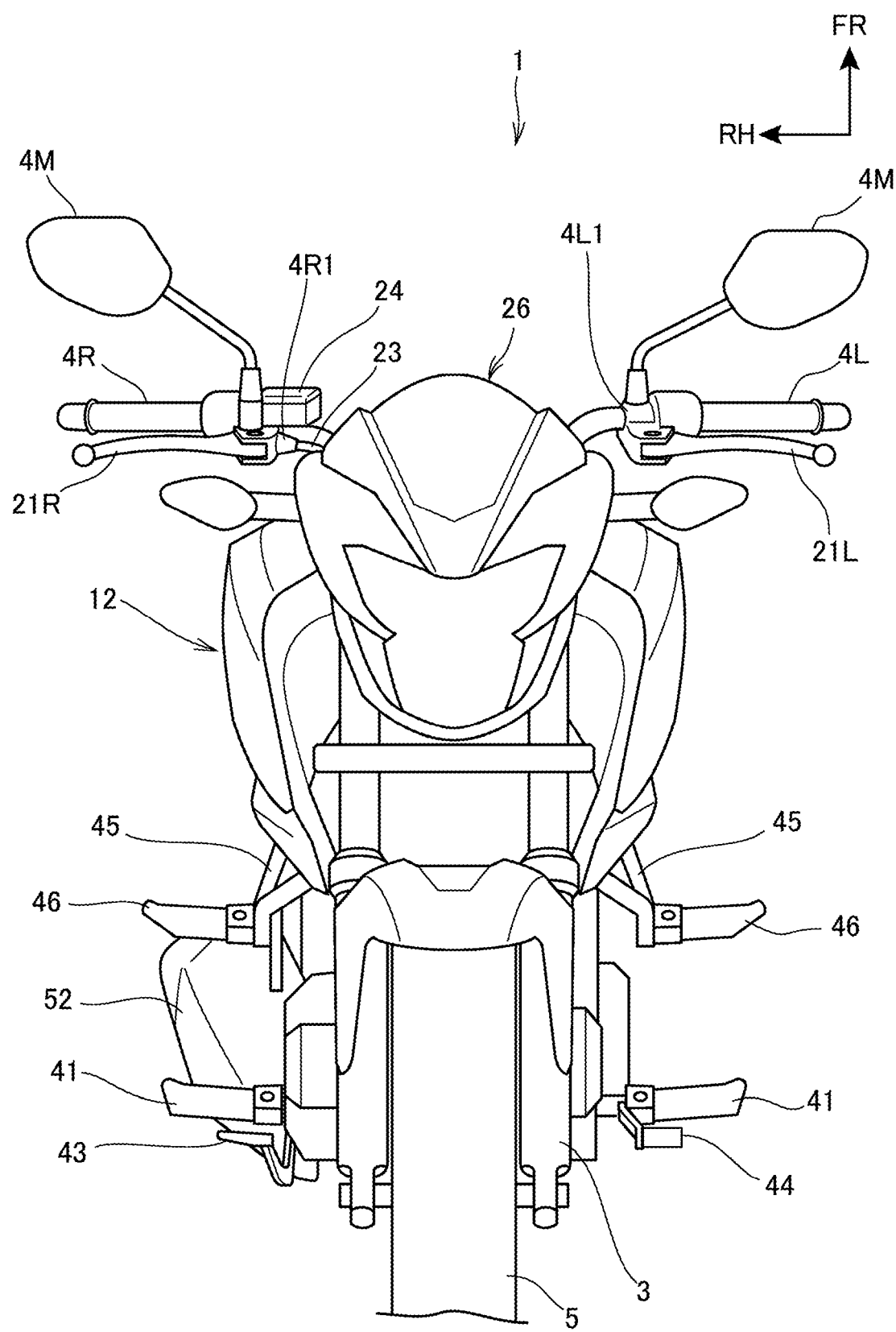
FIG. 2 is a front view of the motorcycle.

FIG. 2 is a front view of the motorcycle 1. Further, FIG. 3 is a right side view illustrating the vehicle body frame 2 with brake-related components, and FIG. 4 is a plan view illustrating the vehicle body frame 2 with the brake-related components.

As illustrated in FIG. 2, a pair of left and right grips 4R and 4L that are grasped by a driver seated on the occupant seat 11 are provided at both ends of the handle 4. The grip 4R at the right side is a throttle grip for performing a throttle operation. In a vicinity of the grip 4R of the handle 4, a front wheel brake lever (a front wheel brake operation element) 21R that operates the front wheel brake 21 in response to a brake operation by a right hand of the driver is provided via a right clamp portion 4R1 that clamps the handle 4.

To the front wheel brake lever 21R, one end portion of a hydraulic pressure pipe (hereunder, referred to as a first hydraulic pressure pipe) 23 that functions as a brake hose is connected via a master cylinder 24 that is provided at the right clamp portion 4R1. By the master cylinder 24, the operation force of the brake lever 21R is transmitted to the first hydraulic pressure pipe 23 as a hydraulic pressure brake operation force.

Figure 3:
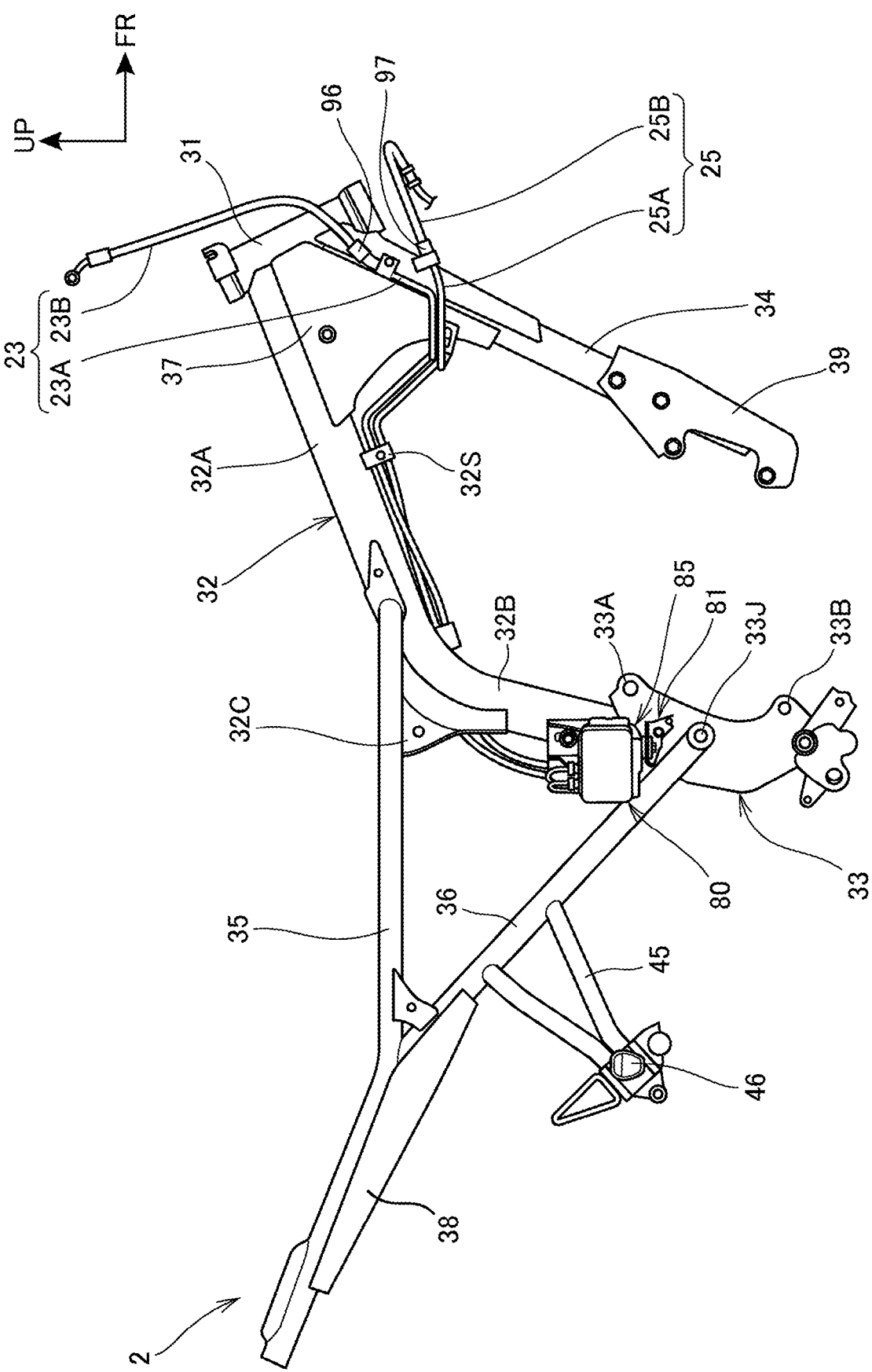
FIG. 3 is a right side view illustrating a vehicle body frame with brake-related components.
Figure 4:
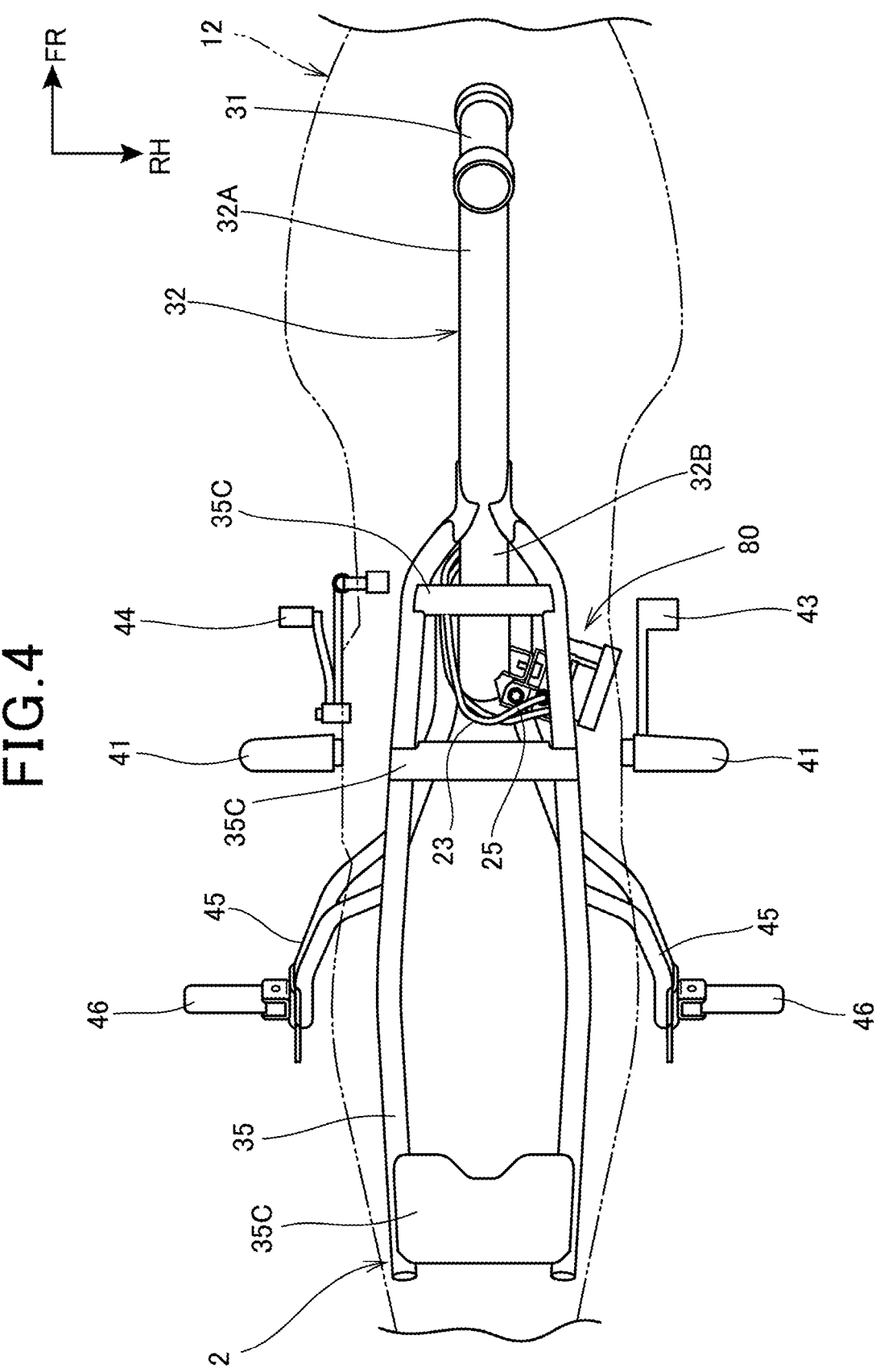
FIG. 4 is a plan view illustrating the vehicle body frame with the brake-related components.

The first hydraulic pressure pipe 23 is routed along the vehicle body frame 2 and is connected to the ABS modulator 80 as illustrated in FIG. 3. Further, a hydraulic pressure pipe (hereunder, referred to as a second hydraulic pressure pipe) 25 that is connected to the front wheel brake 21 is also routed along the vehicle body frame 2 and is connected to the ABS modulator 80 as illustrated in FIG. 3.

In a vicinity of the grip 4L at a left side of the handle 4, a clutch lever (a clutch operation element) 21L that operates a clutch mechanism that is integrally provided at the engine 6 in response to a clutch operation by a left hand of the driver via a left clamp portion 4L1 that clamps the handle 4, is provided. In FIG. 2, reference sign 4M denotes rear mirrors that are provided at a left and a right of the handle 4, and reference sign 26 denotes a front cover that covers a vehicle body front part from a front side and has lights attached thereto.

Next, the vehicle body frame 2 will be described.

As illustrated in FIG. 3 and FIG. 4, the vehicle body frame 2 includes a head pipe 31 that is disposed at a front end portion of the vehicle body frame 2, a single main frame 32 that extends rearward from the head pipe 31, and a pair of left and right pivot brackets (also referred to as pivot frames, and pivot plates) that are connected to a lower rear portion of the main frame 32.

Further, the vehicle body frame 2 includes a single down frame 34 that extends downward from the head pipe 31, a pair of left and right seat rails 35 that extend rearward from a middle of the main frame 32, and a pair of left and right sub frames 36 that bridge the seat rails 35 and the pivot brackets 33. Note that the sub frames 36 support the occupant seat 11 that is supported by the seat rails 35 in an auxiliary manner, and therefore also function as lower side seat rails.

Describing in more detail, the head pipe 31 is formed of a metal pipe that extends downward to a front in a center in a vehicle width direction, and supports the handle 4 and the front fork 3 steerably. Further, a pair of left and right front side gusset plates 37 formed of a metal plate material are respectively provided between a front portion of the main frame 32 and a front portion of the down frame 34.

The main frame 32 is formed of a single pipe member of a metal. The main frame 32 integrally includes a front main frame 32A that extends rectilinearly downward to a rear from the head pipe 31, and a rear main frame 32B that bends from a rear end portion of the front main frame 32A and extends downward to the rear with steeper inclination than the front main frame 32A. The fuel tank 10 is mounted on an upper portion of the front main frame 32A.

A stay 32C that supports an upper end portion of the rear cushion 9 is provided at an upper portion of the rear main frame 32B. The single rear cushion 9 is disposed behind the rear main frame 32B and in the center in the vehicle width direction. Further, the pair of left and right pivot brackets 33 are provided at a lower portion of the rear main frame 32B.

The pair of left and right pivot brackets 33 respectively support front end portions of the pair of left and right swing arms 7 rotatably. The respective pivot brackets 33 are formed of metal plate members that extend in a vertical direction outside in the vehicle width direction of the rear main frame 32B, and inside in the vehicle width direction of the pair of left and right sub frames 36.

A pivot shaft 33J is supported at a vertically middle position of each of the pivot brackets 33. A front end portion of each of the swing arms 7 is rotatably supported via the pivot shaft 33J. Further, support portions 33A and 33B that support a rear part of the engine 6 are provided at an upper front portion and a lower front portion of each of the pivot brackets 33. The respective support portions 33A and 33B support the rear part of the engine 6 by using fastening members. Thereby, the respective pivot brackets 33 also function as rear side engine hangers that support the rear part of the engine 6.

To rear portions of the respective pivot brackets 33, step brackets 42 (FIG. 1) that support a pair of left and right main steps 41 (FIG. 1) on which the driver who is seated on the occupant seat 11 places his or her feet are mounted. Further, to the step bracket 42, a brake pedal (a rear wheel brake operation element) 43 (FIG. 1) that operates the rear wheel brake 22 in response to a brake operation by a right foot of the driver is also mounted. Further, the ABS modulator 80 is supported by the pivot bracket 33 at the right side. A support structure of the ABS modulator 80 will be described later.

A shift pedal 44 (FIG. 2 and FIG. 4) for performing a speed change operation is supported by the pivot bracket 33 at the left side, in addition to the main step 41.

The pair of left and right sub frames 36 are formed of metal pipes with smaller diameters than the main frame 32. The respective sub frames 36 support a pair of left and right pillion steps 46 on which a fellow occupant (seated behind the driver) who is seated on the occupant seat 11 places his or her feet via step brackets 45.

A pair of left and right rear side gusset plates 38 formed of a metal plate material are respectively provided between the rear portions of the respective sub frames 36 and rear portions of the respective seat rails 35.

The down frame 34 is formed of a metal pipe that is relatively thick with a large diameter in the vehicle body frame 2, and a front side engine hanger 39 that supports a front side of the engine 6 is provided at a lower portion of the down frame 34.

The pair of left and right seat rails 35 are formed of metal pipes with smaller diameters than the main frame 32 and the down frame 34. The occupant seat 11 is mounted on the seat rails 35. As illustrated in FIG. 3, a truss structure is formed by the seat rails 35, the sub frames 36 and the rear main frame 32B and therefore, rigidity of the vehicle body frame 2 can be efficiently enhanced. As illustrated in FIG. 4, a cross frame 35C is provided between the pair of left and right seat rails 35 with spaces left in front and rear, and thereby rigidity of the vehicle body frame 2 is also enhanced.

Figure 5:
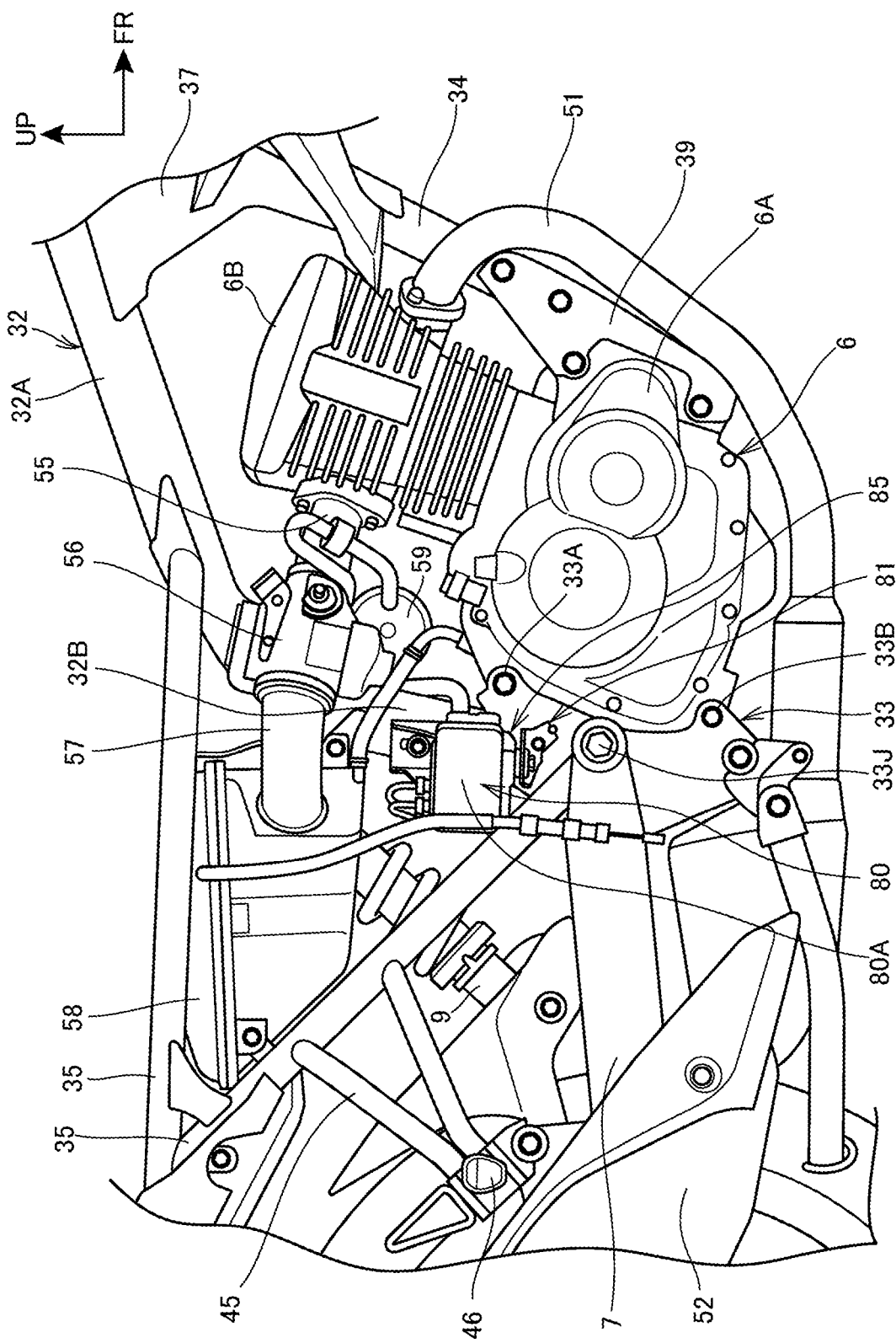
FIG. 5 is a view of a main frame seen from a vehicle body right side with a peripheral configuration.
Figure 6:
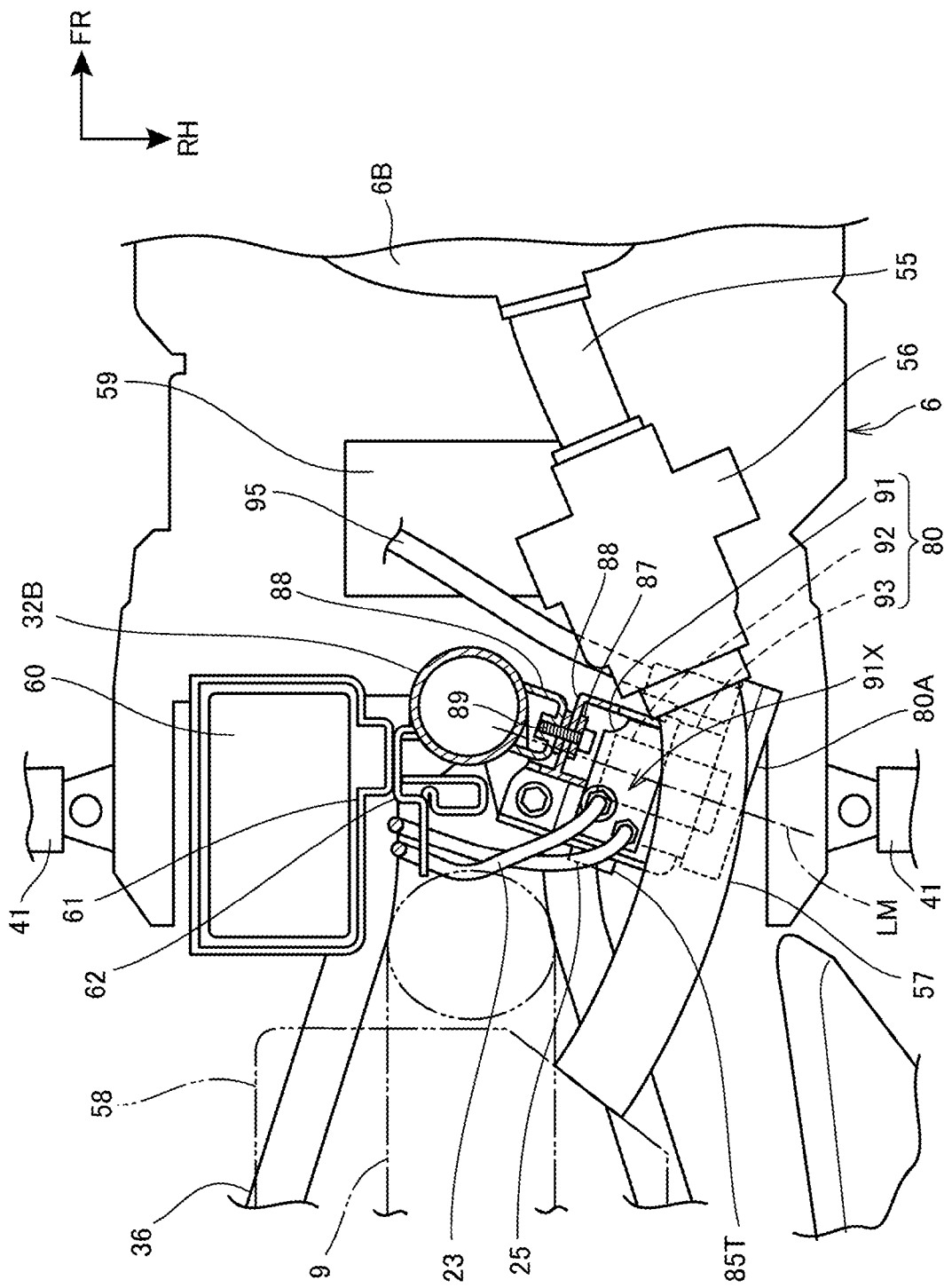
FIG. 6 is a view of the main frame seen from above the vehicle body with the peripheral configuration.

FIG. 5 is a view of the main frame 32 seen from a vehicle body right side with a peripheral configuration. Further, FIG. 6 is a view of the main frame 32 seen from above the vehicle body with a peripheral configuration.

As illustrated in FIG. 5, the engine 6 that functions as a power unit of the motorcycle 1 is supported at rear sides of the down frames 34 and front sides of the pivot brackets 33.

The engine 6 is the power unit that drives the motorcycle 1, and is a single-cylinder engine in which a cylinder unit 6B is vertically provided in a posture inclined forward at an upper front portion of a crankcase 6A, in the present embodiment. An output shaft not illustrated is provided at a rear portion of the crankcase 6A, and power transmission between the engine 6 and the rear wheel 8 is enabled via a chain transmission mechanism not illustrated.

A single exhaust pipe 51 is connected to a front surface of the cylinder unit 6B. The exhaust pipe 51 extends to a vehicle body lower side through a side of the down frame 34 from the cylinder unit 6B, and extends under the crankcase 6A to the vehicle body rear side, and a rear end of the exhaust pipe 51 is connected to a muffler 52. The muffler 52 is disposed behind the pivot bracket 33, and outside in the vehicle width direction, of the swing arm 7.

A fuel supply device 56 is connected to a back surface of the cylinder unit 6B via an insulator 55. The insulator 55 extends rectilinearly by being diagonally inclined rearward in top view (FIG. 6) and outward in the vehicle width direction, and thereby forms a rectilinear intake passage that extends outward (rightward in the present embodiment) in the vehicle width direction, of the rear main frame 32B. Thereby, the insulator 55 and the fuel supply device 56 can be disposed by using a space at a side (a right side) of the rear main frame 32B, and intake air resistance between the cylinder unit 6B and the fuel supply device 56 can be reduced.

An air cleaner box 58 that is located under the occupant seat 11 is connected to a back surface of the fuel supply device 56 via a connecting tube 57. The connecting tube 57 diagonally extends rectilinearly toward a rear side in top view (FIG. 6), and to inside (vehicle width center) in the vehicle width direction, and thereby forms a rectilinear intake passage that extends to a rear side of the rear main frame 32B and to the vehicle width center. Thereby, projection to outside in the vehicle width direction, of the connecting tube 57 is restrained, and intake air resistance between the fuel supply device 56 and the air cleaner box 58 can be reduced.

The above described connecting tube 57 configures a component at an outside in the vehicle width direction of the above described connecting tube 57, and therefore, a slim outer appearance shape in which the vehicle width is reduced more toward the rear side can be made.

Note that in side view (FIG. 5), an intake system that is formed of the insulator 55, the fuel supply device 56, the connecting tube 57 and the air cleaner box 58 is disposed along a horizontal direction, and a space behind the cylinder unit 6B is efficiently used for the intake system.

Further, a canister 59 is disposed in front of the rear main frame 32B and above the crankcase 6A. The canister 59 adsorbs evaporated fuel from the fuel tank 10, and supplies the adsorbed fuel to the intake system (the fuel supply device 56).

As illustrated in FIG. 6, at a left side of the rear main frame 32B, a battery 60 that functions as a power supply of the motorcycle 1 is disposed. As illustrated in FIG. 6, the battery 60 is housed in a battery cover 61. The battery cover 61 is mounted to the left side of the rear main frame 32B via a stay member 62. The battery 60 has a capacity for charging generated power of the engine 6, and supplying the power to respective parts of the vehicle body, and therefore configures a component having a heavy weight among vehicle body components.

The ABS modulator 80 will be described.

As illustrated in FIG. 5, the ABS modulator 80 is supported by the pivot bracket 33 at the right side via a stay 81 of a metal.

Figure 7:
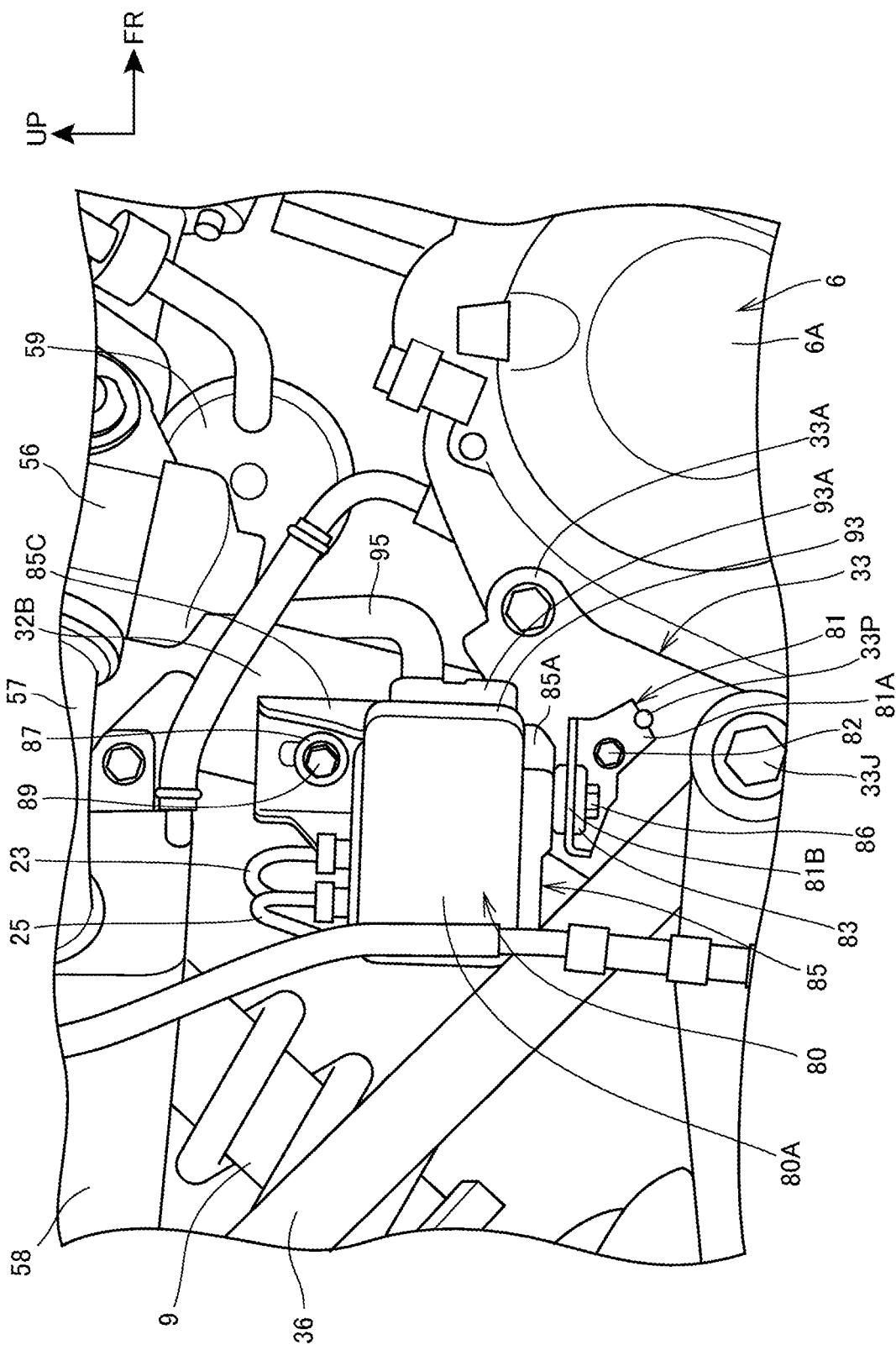
FIG. 7 is a view of an ABS modulator seen from the vehicle body right side with a peripheral configuration.

FIG. 7 is a view of the ABS modulator 80 seen from the vehicle body right side with a peripheral configuration.

The ABS modulator 80 functions as a braking force adjusting device that controls a braking force of the front wheel brake 21 by controlling a brake fluid pressure of the front wheel brake 21, and prevents the front wheel 5 from being locked.

A base end portion 81A of the stay 81 is fixed to a surface on an outside in the vehicle width direction, of the pivot bracket 33 at the right side, by a fastening member 82. Here, the base end portion 81A of the stay 81 is restrained from rotating around the fastening member 82 by engaging with a protruding body 33P that protrudes outward in the vehicle width direction from the pivot bracket 33.

The stay 81 extends outward in the vehicle width direction from the base end portion 81A, and supports a case bracket 85 at a tip end portion 81B, via a rubber member 83 that functions as a shock absorber.

More specifically, the tip end portion 81B of the stay 81 is fitted in a recessed portion that is provided in a vertical center of the rubber member 83 which is formed in a circular column shape. The case bracket 85 is a case on which the ABS modulator 80 is mounted. The case bracket 85 is mounted to a spot (a metal portion 91 that will be described later) of a metal body of the ABS modulator 80 by a fastening member 85T. FIG. 6 illustrates the fastening member 85T that is fastened to the metal portion 91 of the ABS modulator 80 from a vehicle body rear side to the case bracket 85. As the fastening member 85T, a fastening member that is fastened to the metal portion 91 of the ABS modulator 80 from a vehicle body lower side to the base bracket 85 may be further provided.

The case bracket 85 has a mounting portion 85A that abuts on an undersurface of the ABS modulator 80 to support the ABS modulator 80 from a lower side. To the mounting portion 85A, a fastening member 86 is fastened from below so that the rubber member 83 is interposed between the stay 81 and the mounting portion 85A. Thereby, the case bracket 85 is supported by the pivot bracket 33 via the rubber member 83 and the stay 81. By the rubber member 83, a force that acts on the ABS modulator 80 by vertical vibration of the vehicle body frame 2 at a time of traveling is relieved.

Further, the case bracket 85 integrally has a stay portion 85C that extends upward from an end portion of an inner side in the vehicle width direction, of the mounting portion 85A. The stay portion 85C protrudes upward from the ABS modulator 80 through inside in the vehicle width direction, of the ABS modulator 80. An upper portion of the stay portion 85C is fastened to a stay member 88 (refer to FIG. 6) that is provided at a right side surface of the rear main frame 32B via a fastening member 89, via a rubber member 87 that functions as a shock absorber. Thereby, a force that acts on the ABS modulator 80 by lateral vibration of the vehicle body frame 2 at the time of traveling is also relieved.

As illustrated in FIG. 7, in the present configuration, the ABS modulator 80 is provided in a position overlapping the pivot bracket 33 and the rear main frame 32B in vehicle body side view. Thereby, the ABS modulator 80 can be efficiently disposed by using spaces that are left at lateral sides of the pivot bracket 33 and the rear main frame 32B.

Further, the pivot bracket 33 and the rear main frame 32B are located more inward in the vehicle width direction as compared with the intake system and the other frames (the seat rail 35, the sub frame 36), so that the ABS modulator 80 can be disposed toward the vehicle width center, and protrusion to outside in the vehicle width direction can be restrained.

In addition, a disposition region of the ABS modulator 80 is surrounded by the seat rail 35, the sub frame 36 and the rear main frame 32B, so that these frames can be also used as the guard member of the ABS modulator 80.

Further, the ABS modulator 80 is provided above the pivot shaft 33J, and below the connecting tube 57 configuring the intake system, so that the ABS modulator 80 is not disposed outside of the swing arm 7 and the pivot bracket 33. Thereby, projection to outside in the vehicle width direction by the ABS modulator 80 can be restrained.

As illustrated in FIG. 1, the outsides in the vehicle width direction of the ABS modulator 80 and the intake system are covered with the vehicle body cover 12. Consequently, the vehicle body cover 12 can be brought towards the vehicle width center by disposing the ABS modulator 80 to the vehicle width center, and a slim outer appearance shape can be made.

Further, the pivot bracket 33 is provided at a lower position as compared with the other frames (the seat rail 35, the sub frame 36), and therefore the center of gravity of the motorcycle 1 can be lowered by the ABS modulator 80 having the weight.

Further, the pivot bracket 33 is provided in the longitudinal middle position of the vehicle body, and therefore, the position of the center of gravity of the motorcycle 1 is easily brought towards the longitudinal center by the ABS modulator 80.

As illustrated in FIG. 6, the ABS modulator 80 includes a metal portion 91 having a hydraulic pressure circuit in a metal body (a body made of an aluminum alloy in the present configuration), a motor 92 that performs switching of the hydraulic pressure circuit in the metal portion 91 and the like, and a resin portion 93 having an electronic control unit that drives the motor 92, in a resin body.

The metal portion 91 and the resin portion 93 are respectively formed in thin rectangular parallelepiped shapes in which lengths (thicknesses) along the vehicle width direction are smaller as compared with lengths in a longitudinal direction and a vertical direction, and are configured by being connected to each other in the vehicle width direction. The metal portion 91 and the resin portion 93 are disposed in postures that are inclined diagonally rearward and inward in the vehicle width direction, in top view (FIG. 6).

Thereby, the surface 80A on the outside in the vehicle direction of the ABS modulator 80 becomes a surface that inclines rearward and towards the vehicle width center, and projection to outside in the vehicle width direction by the ABS modulator 80 is restrained toward the rear side. Accordingly, the vehicle width in the position corresponding to the ABS modulator 80 becomes slimmer toward the rear side, and a smooth and slim outer appearance shape is made.

The motor 92 is a drive source that drives the ABS modulator 80, and adjusts a braking force of the front wheel brake 21 by the ABS modulator 80. The motor 92 is disposed inward in the vehicle width direction from the surface 80A on the outside in the vehicle width direction of the ABS modulator 80. Further, an axis line LM of the motor 92 is inclined outward and rearward in the vehicle width direction.

Since the axis line LM of the motor 92 inclines outward in the vehicle width direction and rearward, projection to outside in the vehicle width direction of the motor 92 is restrained toward the rear side. Thereby, the vehicle width at the position corresponding to the ABS modulator 80 becomes slimmer toward the rear side, and a smooth and slim outer appearance shape is made.

Further, the metal portion 91 having the motor 92 is provided inward in the vehicle width direction of the ABS modulator 80, and therefore, the position of the center of gravity of the ABS modulator 80 can be brought toward the vehicle width center by the motor 92 and the metal portion 91 having the weights among the components of the ABS modulator 80. In addition, a mounting position (a fastening spot of the fastening member 85T) of the ABS modulator 80 and the case bracket 85 (the case of the ABS modulator 80) becomes close to the mounting position (the stay member 88) of the case bracket 85 and the rear main frame 32B, and is hardly affected by vibration.

Further, the ABS modulator 80 includes the motor 92 and valves and the like configuring the hydraulic pressure circuit, and therefore, is a heavy component having the weight. The heavy component is disposed toward the vehicle width center, which is advantageous in mass concentration of the motorcycle 1.

In addition, as illustrated in FIG. 6, the battery 60 and the ABS modulator 80 are disposed in positions that face each other with the rear main frame 32B therebetween. Thereby, a weight balance of left and right or the like is kept, and the center of gravity is easily optimized.

Furthermore, the ABS modulator 80 is disposed in a position overlapping the connecting tube 57 in top view (FIG. 6), and therefore, can be disposed by efficiently using a space left around the connecting tube 57. Accordingly, the vehicle width by the ABS modulator 80 and the connecting tube 57 is restrained, and a slim outer appearance shape can be obtained.

Furthermore, the vehicle width by the ABS modulator 80 and the connecting tube 57 can be made small, and therefore, effects of enhancing a degree of freedom of movement of feet of the driver, and enhancing foot resting easiness of the driver can be also expected.

As illustrated in FIG. 6, to the metal portion 91 of the ABS modulator 80, the first hydraulic pressure pipe 23 extending from the master cylinder 24 and the second hydraulic pressure pipe 25 extending from the front wheel brake 21 are connected.

Connection positions (denoted by reference sign 91X in FIG. 6) of the respective hydraulic pressure pipes 23 and 25 in the ABS modulator are respectively provided in regions toward the rear side on a top surface of the metal portion 91. The first hydraulic pressure pipe 23 bends inward in the vehicle width direction and downward after extending upward from the connection position in the metal portion 91. Thereby, the first hydraulic pressure pipe 23 is in a bending shape protruded downward inside in the vehicle width direction of the ABS modulator 80 and behind the rear main frame 32B, so that water such as rainwater that adheres to the first hydraulic pressure pipe 23 is easily dropped outside the ABS modulator 80.

As illustrated in FIG. 3 and FIG. 4, the first hydraulic pressure pipe 23 is routed to an opposite side (a left side) of the rear main frame 32 across the rear main frame 32B from a rear side after bending downward from the ABS modulator 80, and is routed toward the vehicle body front side along the rear main frame 32B and the front main frame 32A.

In the position along the front main frame 32A, the first hydraulic pressure pipe 23 extends rectilinearly along the front main frame 32A under and in a vicinity of the front main frame 32A, and is supported by a pipe stay 32S (FIG. 3) that is provided at the front main frame 32A.

The first hydraulic pressure pipe 23 extends rectilinearly forward along the front main frame 32A, thereafter, bends in a vicinity of a rear edge of the front side gusset plate 37 to extend rectilinearly downward to a front (the down frame 34), and is connected to a joint portion (hereunder, referred to as a first joint portion) 96 that is provided at an upper portion of the down frame 34.

The first hydraulic pressure pipe 23 is configured by a metal pipe 23A that is a rigid pipe in a route from the ABS modulator 80 to the first joint portion 96. Further, the first hydraulic pressure pipe 23 is configured by a resin pipe 23B that is a flexible pipe, in a route between the first joint portion 96 and the master cylinder 24. The resin pipe 23B is formed of a resin such as a synthetic rubber, and is flexibly bendable in accordance with movement of the master cylinder 24 accompanying steering of the handle 4.

The second hydraulic pressure pipe 25 from the ABS modulator 80 to a joint portion (hereunder, referred to as a second joint portion) 97 is configured by a metal pipe 25A that is a rigid pipe. Further, the metal pipe 25A of the second hydraulic pressure pipe 25 has the same layout as the metal pipe 23A of the first hydraulic pressure pipe 23. Thereby, the first and the second hydraulic pressure pipes 23 and 25 are collectively routed, and routing work is easy.

The second joint portion 97 is provided in a vicinity of the first joint portion 96, that is, a connection spot of the head pipe 31 and the down frame 34. The second hydraulic pressure pipe 25 is configured by a resin pipe 25B that is a flexible pipe, in a route between the second joint portion 97 and the front wheel brake 21 (the front brake caliper 21B). The resin pipe 25B is formed of a resin such as a synthetic rubber, and is flexibly bendable in accordance with movement of the front wheel brake 21 accompanying steering of the handle 4.

In this way, in the present configuration, the first and second hydraulic pressure pipes 23 and 25 from the ABS modulator 80 to the connection spot of the head pipe 31 and the down frame 34 are configured by the rigid pipes 23A and 25A, so that the region of the flexible pipes 23B and 25B can be reduced to minimum, and a pressure loss can be efficiently reduced.

Further, as illustrated in FIG. 6 and FIG. 7, the resin portion 93 protrudes forward from the metal portion 91, and a connector portion 93A (FIG. 7) that protrudes inward in the vehicle width direction is provided at a portion protruding forward. To the connector portion 93A, a harness 95 bundling wiring extending from the wheel speed sensor 30 and a power supply line from the battery 60 and the like is connected to the connector portion 93A. The harness 95 is disposed in front of the rear main frame 32B by being routed inward in the vehicle width direction from the connector portion 93A, as illustrated in FIG. 6 and FIG. 7.

Accordingly, separation distances between the harness 95 and the first and second hydraulic pressure pipes 23 and 25 can be ensured, and the harness 95 can be arranged by using a space left in front of the rear main frame 32B.

As described above, the ABS modulator (the braking force adjusting device) 80 is disposed in the vicinity of the pivot bracket 33, and therefore, the ABS modulator 80 can be disposed by using the space which is left at the lateral side from the pivot bracket 33. The pivot bracket 33 is located inward in the vehicle width direction as compared with the other frames (the seat rail 35, the sub frame 36), and is disposed at a low position, so that the position of the center of gravity of the vehicle body is easily located at the low position while increase in the vehicle width by the ABS modulator 80 is restrained. Accordingly, the position of the center of gravity of the vehicle body is easily optimized as compared with the case in which the ABS modulator 80 is disposed at a high position in a front side of the vehicle body.

Further, the ABS modulator 80 and the battery 60 are disposed in the positions facing each other with the rear main frame 32B therebetween, and therefore, the weight balance of the vehicle body is easily optimized by the ABS modulator 80 and the battery 60 which have weights.

Further, the axis line LM of the motor 92 of the ABS modulator 80 is inclined outward in the vehicle width direction and rearward, and therefore, projection to outside in the vehicle width direction of the motor 92 is restrained more toward the rear side. Accordingly, the vehicle width in the position corresponding to the ABS modulator 80 becomes smaller toward the rear side, and foot resting easiness of the driver is enhanced.

Further, the ABS modulator 80 includes the metal portion 91 having the motor 92, and the metal portion (91) is disposed toward the vehicle body center, so that the position of the center of gravity of the ABS modulator 80 can be brought toward the vehicle width center. Further, as illustrated in FIG. 6, the mounting position (the fastening spot of the fasting member 85T) of the ABS modulator 80 and the case bracket 85 becomes close to the mounting position (the fastening spot of the fastening member 89) of the case bracket 85 and the rear main frame 32B. Thereby, vibration of the ABS modulator 80 to the rear main frame 32B is restrained, and influence of external vibration on the ABS modulator 80 is restrained.

Further, the connecting tube 57 that configures the intake passage diagonally extends rearward in top view (FIG. 6) and toward the vehicle width center. The connecting tube 57 is disposed above the ABS modulator 80, and inclines rearward along the surface 80A on the outside in the vehicle width direction, of the ABS modulator 80 and toward the vehicle width center. According to the configuration, a smooth and slim outer appearance shape with the vehicle width restrained more toward the rear side is made by the connecting tube 57 and the ABS modulator 80. This also enhances the foot resting easiness of the driver.

Further, since the stay 81 that extends under the ABS modulator 80 from the pivot bracket 33, and supports the ABS modulator 80 from below is included, so that the stay 81 and the like do not protrude outward in the vehicle width direction, the longitudinal direction, or the like from the ABS modulator 80, and the support structure of the ABS modulator 80 can be made compact.

Since the ABS modulator 80 has the connection positions of the first and the second hydraulic pressure pipes 23 and 25 in the modulator 80 provided rearward and toward the vehicle body center, the space left around the rear side of the ABS modulator 80 is used, and a straining space for dropping water such as rainwater adhering to the first and the second hydraulic pressure pipes 23 and 25 is easily ensured. Further, the ABS modulator 80 has the connection position of the harness 95 provided toward the front side, and therefore, the separation distances between the first and the second hydraulic pressure pipes 23 and 25, and the harness 95 can be ensured.

Furthermore, the first and the second hydraulic pressure pipes 23 and 25 that extend forward from the ABS modulator 80 are configured by the metal pipes 23A and 25A to a predetermined position (the connection spot of the head pipe 31 and the down frame 34) in the vicinity of the head pipe 31, and are configured by the resin pipes 23B and 25B from the above described predetermined position. Thereby, ranges of the metal pipes 23A and 25A can be increased, and a pressure loss can be reduced, while the first and the second hydraulic pressure pipes 23 and 25 are made movable in response to handle steering by flexibility of the resin pipes 23B and 25B.

Further, since the first and the second hydraulic pressure pipes 23 and 25 are routed under the main frame 32, the respective hydraulic pressure pipes 23 and 25 can be arranged efficiently by using the space under the head pipe 31. Further, routing is performed along the main frame 32, assembling workability can be enhanced. Further, the respective hydraulic pressure pipes 23 and 25 are easily cooled by using traveling wind passing under the main frame 32.

Further, since the pivot bracket 33 has the support portions 33A and 33B that support the engine 6, the pivot bracket 33 can be also used as the engine hanger, and the number of components can be reduced.

The aforementioned embodiment is only one mode of carrying out the present invention, and modification and application can be arbitrarily made within the range without departing from the gist of the present invention.

For example, in the aforementioned embodiment, the case of applying the present invention to the motorcycle 1 illustrated in FIG. 1 is explained, but the present invention is not limited to this. For example, the present invention may be applied to a motorcycle in which the main frame 32 has a plurality of frames with spaces left laterally, without being limited to the motorcycle 1 having the single main frame 32. Further, the case of applying the present invention to the motorcycle 1 having the ABS modulator 80 of one channel is explained, but the present invention may be applied to a motorcycle having an ABS modulator of multiple channels corresponding to the front and rear wheels 5 and 8. Further, the rear wheel brake 22 may be a disk brake device.

Further, the engine 6 is explained as the power unit by being cited as an example, but the power unit is not limited to this, and, for example, the power unit may be of a configuration using an electric motor which is driven by a battery.

Further, the present invention can be applied to straddle-type vehicles including straddle-type vehicles other than motorcycles. The straddle-type vehicles are vehicles including all vehicles to be ridden astride vehicle bodies, and include not only motorcycles (including motor-assisted bicycles) but also tricycles and four-wheel vehicles that are classified into ATVs (all-terrain vehicles).

REFERENCE SIGNS LIST

1 Motorcycle (straddle-type vehicle)
5 Front wheel (wheel)
6 Engine (power unit)
8 Rear wheel (wheel)
7 Swing arm
23 First hydraulic pressure pipe
23A, 25A Metal pipe
23B, 25B Resin pipe (flexible pipe)
25 Second hydraulic pressure pipe
31 Head pipe
32 Main frame
32A Front main frame
32B Rear main frame
32S Pipe stay
33 Pivot bracket
33A, 33B Support portion
34 Down frame
35 Seat rail
57 Connecting tube (intake passage)
60 Battery
80 ABS modulator (braking force adjusting device)
80A Surface on outside in vehicle width direction
81 Stay
91 Metal portion
92 Motor
93 Resin portion
LM axis line of motor

The invention claimed is:

1. A straddle vehicle comprising a head pipe, a main frame that extends rearward from the head pipe, a pivot bracket which is joined to a lower rear portion of the main frame, and to which a swing arm is swingably connected, a seat rail that extends rearward from the main frame, and a braking force adjusting device that adjusts a braking force of wheels,
wherein the braking force adjusting device is disposed at an outside, in a vehicle width direction, of the pivot bracket,
the braking force adjusting device includes a motor that adjusts a braking force,
an axis line of the motor inclines outward in a vehicle width direction and rearward,
the straddle vehicle further comprises:
a battery,
wherein the battery and the braking force adjusting device are disposed in positions facing each other with the main frame therebetween.

2. The straddle vehicle according to claim 1,
wherein the braking force adjusting device includes a metal portion having the motor,
wherein the metal portion is disposed toward a vehicle body center.

3. The straddle vehicle according to claim 1,
wherein the braking force adjusting device has connection positions of hydraulic pressure pipes in the device provided rearward and toward a vehicle body center.

4. The straddle vehicle according to claim 1, further comprising:
a stay that extends under the braking force adjusting device from the pivot bracket, and supports the braking force adjusting device from below.

5. The straddle vehicle according to claim 4, further comprising:
a case bracket on which the braking force adjusting device is mounted and which is supported by the pivot bracket via the stay,
the case bracket has a stay portion that protrudes upward with respect to the braking force adjusting device through the inside in the vehicle width direction of the braking force adjusting device, and
the stay portion overlaps the main frame in side view and is fastened to the main frame at a position above the braking force adjusting device and the pivot bracket.

6. The straddle vehicle according to claim 1, comprising a down frame that extends downward from the head pipe,
wherein hydraulic pressure pipes that extend forward from the braking force adjusting device are connected to joint portions provided at an upper portion of the down frame, the hydraulic pressure pipes are configured by metal pipes to the joint portions from the braking force adjusting device and are configured by resin pipes from the joint portion.

7. The straddle vehicle according to claim 1,
wherein hydraulic pressure pipes that extend forward from the braking force adjusting device are routed under the main frame.

8. The straddle vehicle according to claim 1, further comprising:
an intake passage that extends diagonally rearward and toward a vehicle width center in plan view,
wherein the intake passage is disposed above the braking force adjusting device, and inclines rearward and toward a vehicle width center along a surface on an outside in a vehicle width direction, of the braking force adjusting device.

9. The straddle vehicle according to claim 8, further comprising:
a connecting tube that configures the intake passage and passes an outside in the vehicle width direction, of the main frame,
the braking force adjusting device is provided outside in the vehicle width direction at a same side of the connecting tube with respect to the main frame and is provided between the connecting tube and a pivot shaft supported by the pivot bracket in side view.

10. The straddle vehicle according to claim 1,
wherein the pivot bracket has support portions that support an engine of the straddle-type vehicle.

11. A straddle vehicle comprising a head pipe, a main frame that extends rearward from the head pipe, a pivot bracket which is joined to a lower rear portion of the main frame, and to which a swing arm is swingably connected, a seat rail that extends rearward from the main frame, and a braking force adjusting device that adjusts a braking force of wheels,
wherein the braking force adjusting device is disposed in at an outside, in a vehicle width direction, of the pivot bracket,
the braking force adjusting device includes a motor that adjusts a braking force, an axis line of the motor inclines outward in a vehicle width direction and rearward,
the straddle vehicle further comprises:
a stay that extends under the braking force adjusting device from the pivot bracket, and supports the braking force adjusting device from below; and
a case bracket on which the braking force adjusting device is mounted and which is supported by the pivot bracket via the stay,
the case bracket has a stay portion that protrudes upward with respect to the braking force adjusting device through inside in the vehicle width direction of the braking force adjusting device, and
the stay portion overlaps the main frame in side view and is fastened to the main frame at a position above the braking force adjusting device and the pivot bracket.

12. A straddle vehicle comprising a head pipe, a main frame that extends rearward from the head pipe, a pivot bracket which is joined to a lower rear portion of the main frame, and to which a swing arm is swingably connected, a seat rail that extends rearward from the main frame, and a braking force adjusting device that adjusts a braking force of wheels,
   wherein the braking force adjusting device is disposed in at an outside, in a vehicle width direction, of the pivot bracket,
   the braking force adjusting device includes a motor that adjusts a braking force,
   an axis line of the motor inclines outward in a vehicle width direction and rearward,
   the straddle vehicle further comprises:
   an intake passage that extends diagonally rearward and toward a vehicle width center in plan view,
   wherein the intake passage is disposed above the braking force adjusting device, and inclines rearward and toward the vehicle width center along a surface on an outside in a vehicle width direction, of the braking force adjusting device.

13. A straddle vehicle comprising a head pipe, a main frame that extends rearward from the head pipe, a pivot bracket which is joined to a lower rear portion of the main frame, and to which a swing arm is swingably connected, a seat rail that extends rearward from the main frame, and a braking force adjusting device that adjusts a braking force of wheels,
   wherein the braking force adjusting device is disposed at an outside, in a vehicle width direction, of the pivot bracket,
   the braking force adjusting device includes a motor that adjusts a braking force,
   an axis line of the motor inclines such that the outside, in the vehicle width direction, of the axis line is located behind the inside, in the vehicle width direction, of the axis line,
   a surface on the outside, in the vehicle direction, of the braking force adjusting device inclines rearward and toward a vehicle width center.

* * * * *